United States Patent

Miller

[15] 3,693,368
[45] Sept. 26, 1972

[54] METHOD OF SEPARATING WATER FROM A SOLUTION

[72] Inventor: Robert D. Miller, Cornell University, Ithaca, N.Y. 14850

[22] Filed: Feb. 19, 1971

[21] Appl. No.: 117,096

Related U.S. Application Data

[63] Continuation of Ser. No. 684,008, Nov. 17, 1967, abandoned.

[52] U.S. Cl. .......................... 62/58, 62/123, 210/22
[51] Int. Cl. ............................................. B01d 9/04
[58] Field of Search ...................... 62/58; 210/22, 23

[56] References Cited

UNITED STATES PATENTS

| | | | |
|---|---|---|---|
| 2,765,921 | 10/1956 | Green | 62/58 |
| 2,940,272 | 6/1960 | Croley | 62/58 |
| 2,981,773 | 4/1961 | Weedman | 62/58 |

Primary Examiner—Norman Yudkoff
Assistant Examiner—R. T. Foster
Attorney—Stowell & Stowell

[57] ABSTRACT

Water is separated from aqueous solutions by maintaining a body of water in the solid phase between two spaced porous phase barriers, maintaining a body of aqueous solution in a supercooled condition in contact with the opposite side of one barrier, maintaining a body of liquid water in a supercooled condition in contact with the opposite side of the other barrier and subjecting the body of the solution to a pressure that exceeds the pressure on the body of liquid water by more than the osmotic pressure of the solution.

3 Claims, 1 Drawing Figure

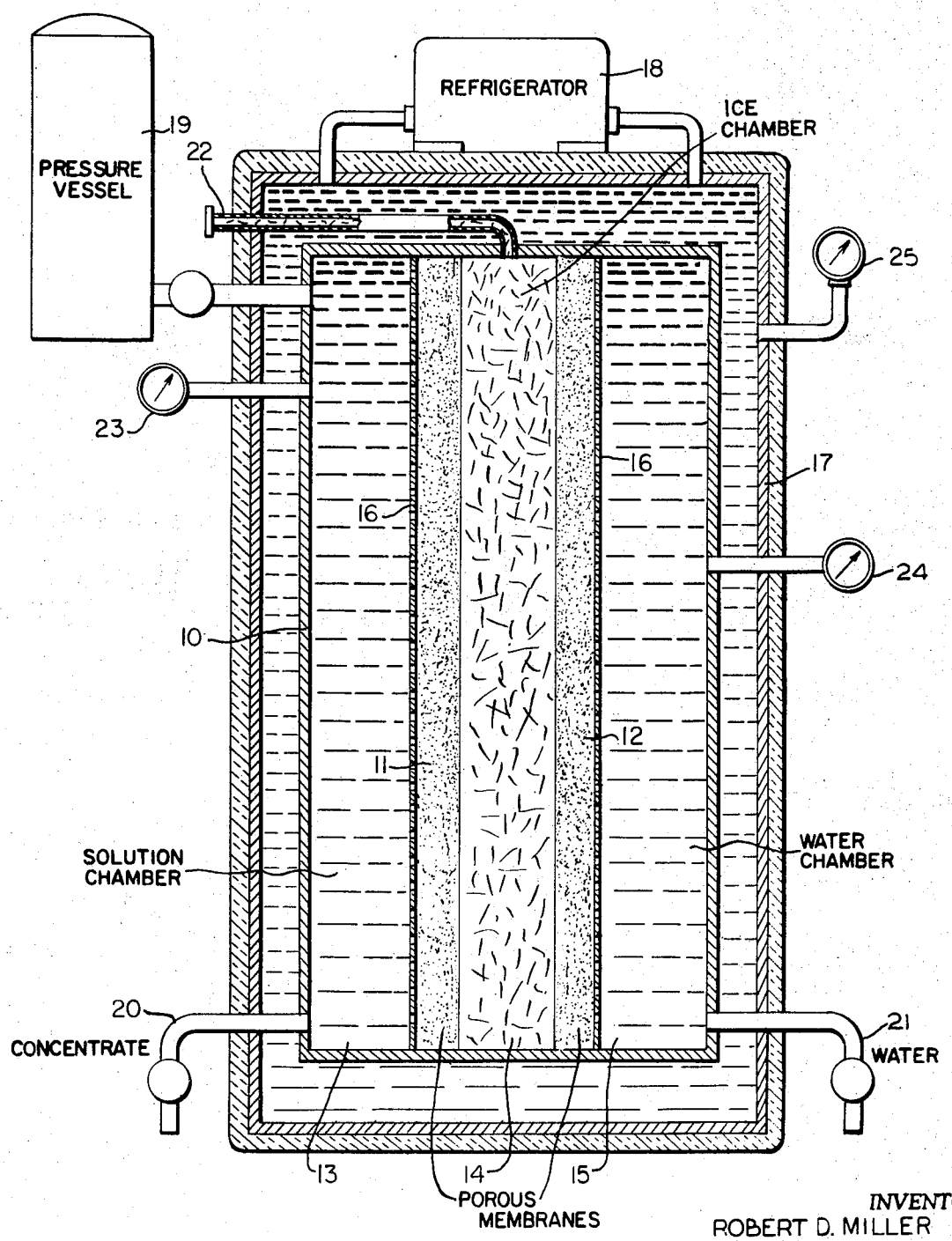

METHOD OF SEPARATING WATER FROM A SOLUTION

This is a continuation of Ser. No. 684,008, filed Nov. 17, 1967, now abandoned.

This invention relates to the separation of water from aqueous solutions utilizing porous membranes as phase barriers and water in the solid phase as solute barrier. The water moiety can traverse the phase boundary between a liquid and the solid phase more freely than the solute moiety. The purpose of the invention is achieved by combining this phenomenon with porous membranes that limit the movement or growth of phase boundaries. A stream of aqueous solution is effectively divided into two parts, one of which is a stream of more concentrated solution while the other is a stream of pure or substantially pure water.

The method of the invention may be represented schematically by the following sequence of components: (body of aqueous solution) (porous phase barrier) (ice solute barrier) (porous phase barrier) (body of water). The aqueous solution is subjected to a pressure that exceeds the pressure on the water by more than the osmotic pressure of the solution. The water moiety traverses the train of components more freely than the solute moiety so that the concentration of the residual aqueous solution increases and the quantity of water at the end of the train also increases. The water moiety is converted to ice which serves as a solute barrier. The ice traverses the space between the phase barriers and is then converted back to the liquid form which traverses the second phase barrier and joins the body of water.

In order to maintain an ice solute barrier in operative contact with both the aqueous solution and with liquid water, it is advantageous to provide a pair of porous membranes in parallel spaced relation with a body of aqueous solution in contact with the outer face of one membrane and a body of water in contact with the outer face of the other. The membranes themselves are hydrophilic so that they are readily wetted by water and by the aqueous solution. A body of ice occupies the space between the membranes. In order to enhance the efficiency of the process, it is advantageous to place the membranes as close together as possible providing ice is everywhere present between the membranes, in order to facilitate the transfer of the heat of transition from one side of the ice to the other.

It is necessary to maintain the temperature at a point at which ice would form spontaneously in either the body of solution or the body of water if an ice nucleus of adequate size were introduced into the solution or the water. That is, both liquid phases are in the supercooled condition. The phase barriers serve to prevent the ice between the barriers from nucleating freezing on the opposite sides of the barriers.

It is particularly to be noted that although the process functionally simulates the process of reverse osmosis employing selective transmission of water and solutes by membranes, the separation of water from the solution by the method of the invention is not effected by any filtering action of the pores of the membrane but is accomplished by the selective action of the phase transition from liquid aqueous solution to the ice phase, which is employed as the solute barrier. The role of the porous membrane is that of a phase barrier which prevents the ice phase from penetrating into space occupied by the liquid phase at a lower pressure.

In continuous operation of the method of the invention, it is advantageous to circulate the body of solution in contact with the porous membrane to avoid localized high concentrations of solute.

The principles of the invention and modes of putting them into practice will be further described with reference to the accompanying drawing which is a semidiagrammatic representation of apparatus suitable for use in practicing the invention.

In the apparatus of the drawing, 10 is a metal walled concentrator vessel divided by porous membranes 11 and 12 into a solution chamber 13, an ice chamber 14 and a water chamber 15. The porous membranes 11 and 12 are supported by perforated metal plates 16. The concentrator vessel is suspended in insulated cooler 17 maintained at a predetermined temperature by refrigerator 18. The solution chamber 13 is supplied with solution to be concentrated from pressure vessel 19 and concentrated solution is withdrawn at 20. Water abstracted from the solution is withdrawn from water chamber 15 at 21. A metal tube 22 extends from the ice chamber 14 to the exterior, and is sealed at that end. The solution chamber and the water chamber are provided with pressure gauges 23, 24 and with a thermometer 25 in the outer bath, 17.

In an illustrative operation, with an apparatus of the type illustrated provided with Millipore GSWP 02500 cellulose porous membranes having a nominal pore size of 0.22 micron and a porosity of about 80 percent supported on perforated plates of stainless steel, a solution of sodium chloride having a concentration of 8.5 milliequivalents per liter was supplied to the solution chamber and the ice and water chambers were filled with water. The ensemble was cooled to $-0.15°$ C. and ice was formed in the ice chamber by pressing a lump of dry ice on the outer end of nucleating tube 22. Under a pressure of 95 cm of mercury above atmospheric on the solution in the solution chamber water was passed through the membranes into the water chamber at the rate of about 0.1 cubic centimeter per hour per square centimeter of membrane.

Under the same conditions, a solution of calcium chloride having a concentration of 11.5 milliequivalents per liter, water was passed through the membranes into the water chamber at substantially the same rate.

I claim:

1. A method of concentrating aqueous solutions and separating substantially pure liquid water therefrom which comprises maintaining a body of ice occupying the space between the opposed surfaces of two spaced porous membranes, maintaining a body of the aqueous solution to be concentrated in a supercooled condition in contact with the opposite side of one membrane, maintaining a body of liquid water in a supercooled condition on the opposite side of the other membrane, and subjecting the body of the solution to a pressure that exceeds the pressure on the body of liquid water by more than the osmotic pressure of the solution.

2. A method as defined in claim 1 wherein the porous membranes are hydrophilic.

3. A method as defined in claim 1 wherein the aqueous solution is circulated in contact with the porous membrane at a rate effective to prevent local accumulation of solute in the vicinity of the membrane.

* * * * *

UNITED STATES PATENT OFFICE
CERTIFICATE OF CORRECTION

Patent No. 3,693,368           Dated September 26, 1972

Inventor(s) ROBERT D. MILLER

It is certified that error appears in the above-identified patent and that said Letters Patent are hereby corrected as shown below:

Insert -- Assignee: Research Corporation,
                          New York, New York --.

Signed and sealed this 10th day of April 1973.

(SEAL)
Attest:

EDWARD M. FLETCHER, JR.          ROBERT GOTTSCHALK
Attesting Officer                   Commissioner of Patents